United States Patent [19]

Krupa et al.

[11] Patent Number: 5,456,379
[45] Date of Patent: Oct. 10, 1995

[54] BLUEBERRY CONTAINER

[76] Inventors: Calvin S. Krupa, 750 Navajo Rd., Medina, Minn. 55340; Robert Knoss, 19081 Hopi St., Anoka, Minn. 55303

[21] Appl. No.: 317,296

[22] Filed: Oct. 3, 1994

[51] Int. Cl.⁶ .................. B65D 21/032; B65D 51/04; B65D 25/54
[52] U.S. Cl. .................. 220/339; 220/608; 220/653; 220/669; 220/676; 206/508; 206/511
[58] Field of Search .................. 220/339, 367.1–368, 220/605, 608, 628, 669, 675–676, 659, 651–653, DIG. 14, DIG. 15; 229/120, 916; 206/508, 511, 503

[56] References Cited

U.S. PATENT DOCUMENTS

| | | | |
|---|---|---|---|
| 1,886,374 | 11/1932 | Breton . | |
| 1,945,878 | 2/1934 | Breton | 229/6 |
| 3,286,877 | 11/1966 | Haimes | 220/83 |
| 3,331,529 | 7/1967 | Slapnik | 220/97 |
| 3,393,858 | 7/1968 | Heel | 229/23 |
| 3,480,197 | 11/1969 | Massey | 229/43 |
| 3,524,431 | 8/1970 | Graham | 119/19 |
| 4,197,958 | 4/1980 | Zeni et al. | 220/72 |
| 4,261,505 | 4/1981 | Matsui | 229/43 |
| 4,884,739 | 12/1989 | Nederveld | 229/109 |

*Primary Examiner*—Allan N. Shoap
*Assistant Examiner*—Nathan J. Newhouse
*Attorney, Agent, or Firm*—Haugen and Nikolai

[57] ABSTRACT

A re-usable tray for securely containing both small and large perishable goods, while providing a unique means for ventilating and circulating fluids is described. The ventilating means efficiently permits the transfer of fluids between the interior and exterior of the tray. The tray may be combined with a cover to form a container. The container may contain blueberries and other small perishable goods, wherein the ventilating means is not blocked by these goods. Further, the ventilating means provides for drainage to minimize condensation build up. The container also has ribs extending from the sides, front and back of the container providing rigidity and support to the container. The ribs have slits that provide additional ventilation to the container. The container also has a support means for preventing the top and bottom of the container from bending or curving into the interior storage area of the container.

15 Claims, 4 Drawing Sheets

BLUEBERRY CONTAINER

BACKGROUND OF THE INVENTION

I. Field of the Invention

This invention relates generally to trays for containing perishable goods within the tray's interior storage area. More particularly, this invention relates to reusable trays for containing both small and large perishable goods, while providing a ventilation means that efficiently permits the flow of fluids around the tray's bottom and between the tray's exterior and interior. The tray also provides drainage to minimize condensation build up. The tray may be combined with a cover to form a container which includes support means that prevents the cover or tray from collapsing into the interior storage area.

II. Discussion of the Related Art

Various containers have been used for the transportation, storage, and display of perishable fruits, vegetables, and other perishable goods. The container may include a tray or a tray with a cover. These containers or containers often have openings formed in the walls. The openings allow overall ventilation between the interior and exterior of the container. One such example is the L. Hames patent, U.S. Pat. No. 3,286,877 (the '877 patent), which discloses a plastic vegetable container having vent slits in the sides and ends of the tray.

Hames also shows a base having a plurality of relatively narrow bottom stiffening ribs provided for structural support. Within the bottom of the tray drain holes are formed. These drain holes may be used for ventilation, however, smaller items of perishable goods such as blueberries could block the holes, thereby preventing drainage and ventilation of the tray and container. Further, when the containers are stacked, the trays do not provide an adequate passageway to circulate air between all of the containers in the stack. By circulating air into the middle of a stack of containers, all the containers in the stack are more thoroughly ventilated. Therefore, there is a need for a tray or container that allows for such ventilation.

When stacking containers, there is a need to provide ventilation between each stacked container and to containers that are in the middle of the stack. The Heel Patent, U.S. Pat. No. 3,393,858 provides for a spacer attached to all sides of a container to separate the container when stacked. This separation between the containers allows air to circulate into air holes formed in the tray and cover. However, the spacers do not provide an adequate passageway to circulate air between all the containers in a stack. Also, although the spacers allow partial air circulation, the spacers require additional materials, space and expense. The spacers also do not effectively support stacked containers. Therefore, there is a need to minimize the amount of space between stacked containers, while still providing a ventilation means which allows air to circulate completely around and through the container.

To prevent the bruising and spoilage of the blueberries during storage, transportation, and display, a semi-rigid, well ventilated stackable tray or container is required. When containers are stacked, the cover and tray forming the container must be rigid to prevent bowing or collapse of the cover or tray towards the interior of the container. A thicker, more rigid material may be used, however, the economic efficiency of such a container is far reduced. Thus, there is a need for a low cost, yet non-bowing, container.

The present invention overcomes these disadvantages by providing a tray having a unique ventilation and drainage means. The ventilation means enhances the passage of fluids around the bottom of the tray and permits transfer of fluids between the tray's interior and exterior. Further, the tray's unique ventilation and drainage means, is not blocked by small perishable goods contained within the tray. The ventilated tray may be combined with a cover to form a uniquely ventilated container. Also, the container provides a support means which prevents the center section of the cover and tray from sagging toward the interior of the container.

SUMMARY OF THE INVENTION

The purpose of the present invention is to provide a reusable, ventilated tray that reduces spoilage and bruising of blueberries. The tray may be combined with a cover to form a container. The container may be joined together by a living hinge. A container which includes a living hinge is preferably molded as one piece. While the present invention may be adaptable to use in any number of trays or containers for perishable goods, the invention will be explained in the context of its utility in combination with a cover to form a container which includes both a cover and tray. Those skilled in the art will appreciate that the invention is equally useful as a tray without an attached cover.

The container's tray has a continuous side wall (or spaced parallel sides, front and back); an open top; a closed bottom or bottom wall; a lip peripherally extending around the open top; a ventilation and drainage means for permitting the passage of fluids between the tray's interior and exterior; and a support means for supporting and aligning the cover and tray.

The cover has a continuous side wall separated by a distance approximately equal to the tray's side wall, an open bottom and a closed top. Extending down from the cover's top towards the cover's open bottom is a conical locator which engages with the support means while indexing the cover to the tray. Both the cover and tray have support ribs extending outward from the continuous side wall. The support ribs have slits which allow fluids, including liquids and gases, to pass through the container.

The ventilation means of the tray comprises at least one elongated channel formed and extending from the tray's bottom. Those skilled in the art will appreciate that the ventilation means may be integral with the continuous sidewalls or the tray's bottom. However, in the preferred embodiment, the ventilation means is integral with the tray's bottom. The elongated channel is open near the tray's bottom, and projects to a peak toward the interior storage area. Those skilled in the art will recognize that the ends of the elongated channel may be open or closed, however in the preferred embodiment the elongated channels have open ends. The elongated channel forms a passageway beneath the interior storage area for permitting transfer of fluids through the passageway. The elongated channel's passageway also allows fluid to pass through the passageway to the other end of the elongated channel.

A depression is formed in the elongated channel's peak. The depression is open to the interior storage area and extends from the peak into the passageway. The depression has at least one opening which extends between the passageway and the interior storage area. The opening permits the transfer of fluids between the interior storage area and the channel. The openings also allow drainage of condensation or moisture. The depression is further designed to prevent small perishables, e.g.: blueberries, from blocking the passage of fluid through the openings.

It is accordingly a principle object of the present invention to provide a tray that has a ventilation and drainage means which cannot be blocked by perishable goods that are placed within the tray.

Another object of the present invention is to provide a stackable, reusable container for containing perishable goods, having a reusable locking cover and tray, wherein the container has complete ventilation and drainage.

A further object of the present invention is to provide a stackable, reusable container having a support means to prevent inward sagging or bowing of the cover or tray.

Another object of the present invention is to provide a tray or container that reduces the amount of bruising to perishable goods enclosed within the tray.

Yet another object of the present invention is to provide a reusable container that minimizes the amount of stacking space required, while still providing ample ventilation into and out of the container.

Still a further object of the present invention is to provide a one-piece hinged, ventilated, cover and tray, wherein the cover locks into position on the tray forming a secure container with sufficient ventilation to allow storage of small perishables without spoilage.

These and other objects, as well as these and other features and advantages of the present invention will be readily apparent to those skilled in the art from a review of the following detailed descriptions of the preferred embodiment in conjunction with the accompanying drawings and claims.

DETAILED DESCRIPTION OF THE PREFERRED EMBODIMENT

Figure 1:
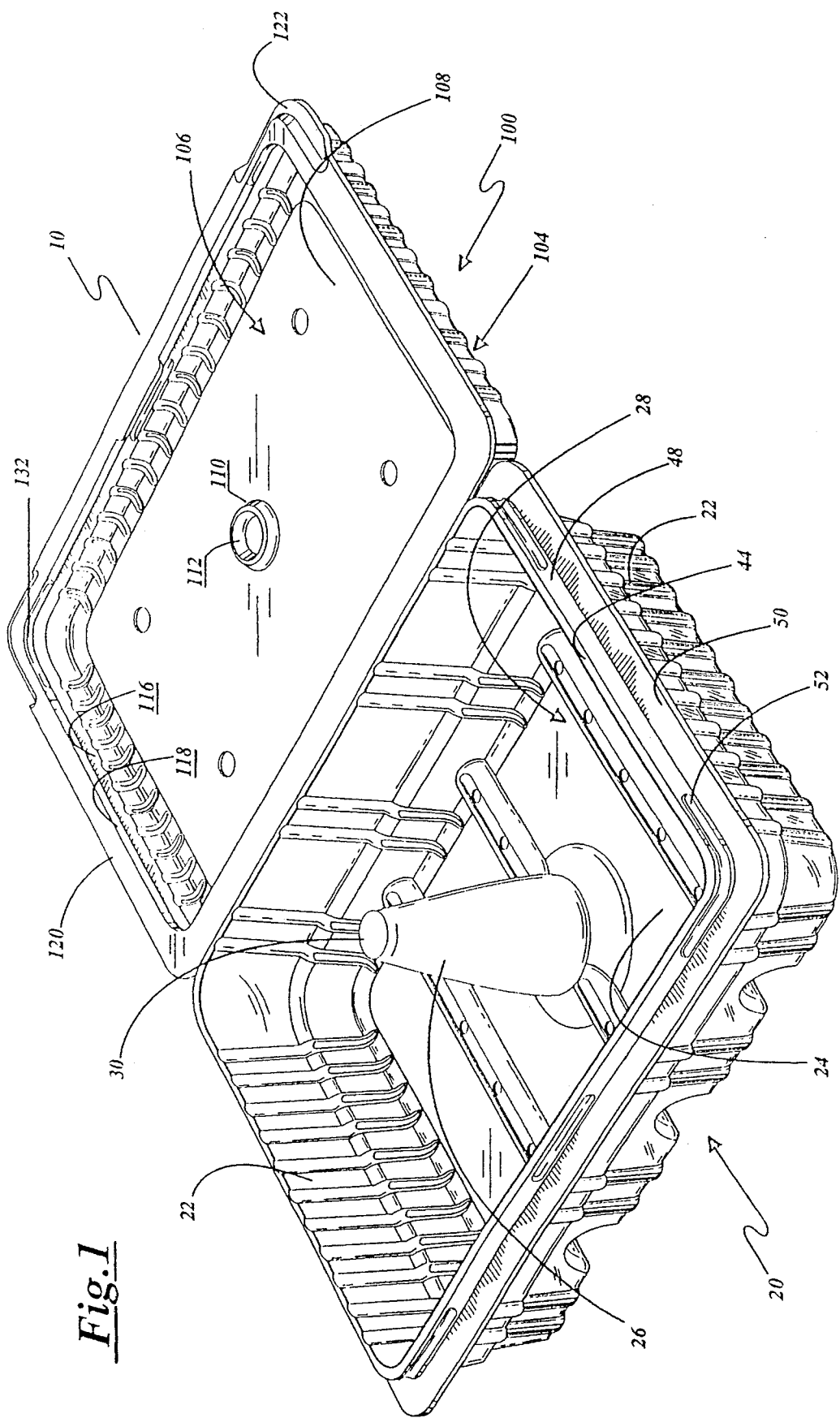
FIG. 1 is a perspective view of the container with the cover opened and rotated away from the tray.

Referring first to FIG. 1, there is indicated generally the container 10 for securely containing blueberries. The container comprises a tray 20, and a cover 100. In the preferred embodiment, when the tray is combined with a cover, a living hinge 54 connects the tray 20 to the cover 100. Without limitation, the cover and tray are preferably molded in one piece from a semi-rigid polymer. The cover 100 is thereby allowed to rotate onto the tray 20, around the hinge 54.

Figure 3:
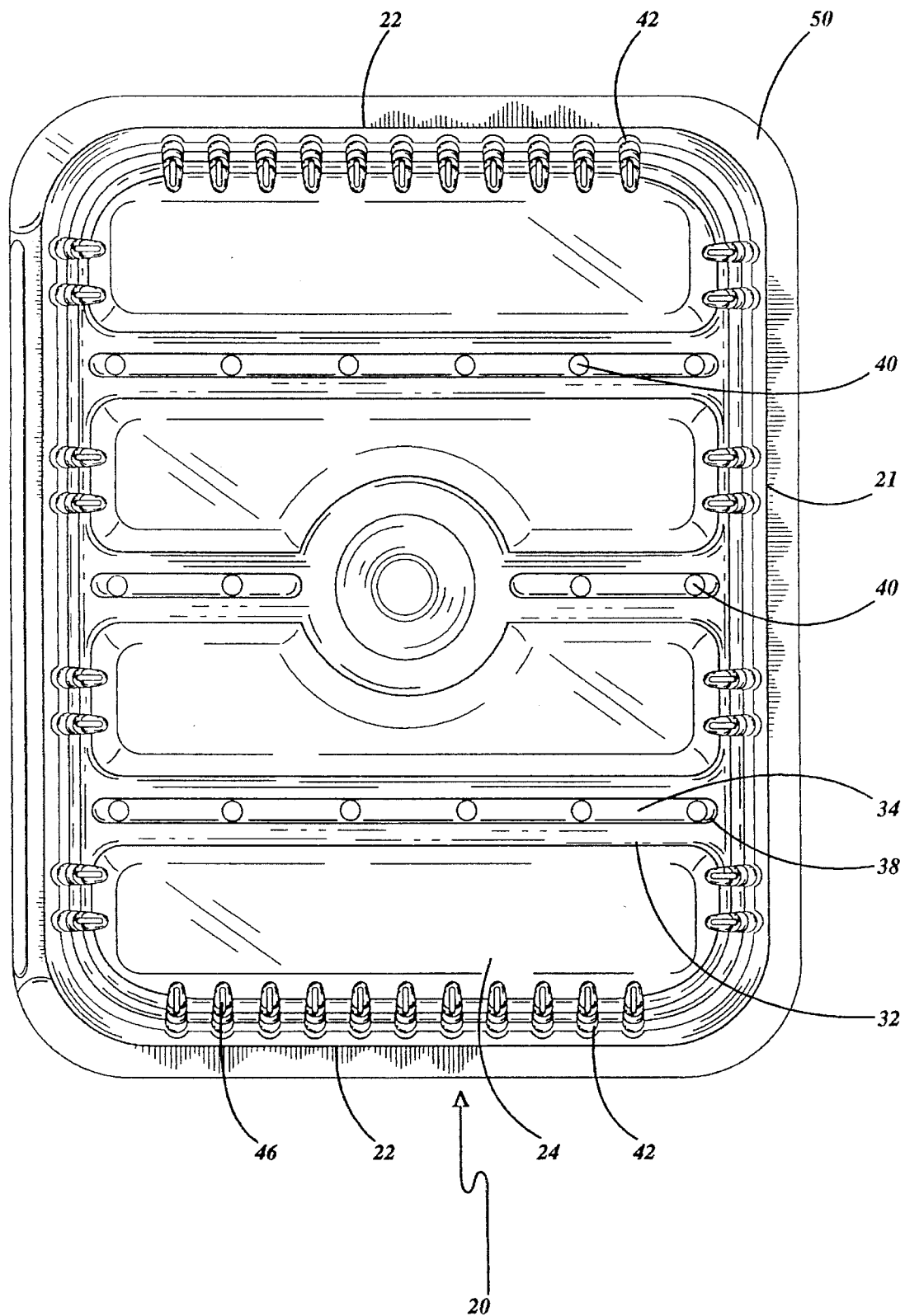
FIG. 3 is a bottom view of the container of the type shown in FIG. 1 with the cover closed and rotated onto the tray.
Figure 4:
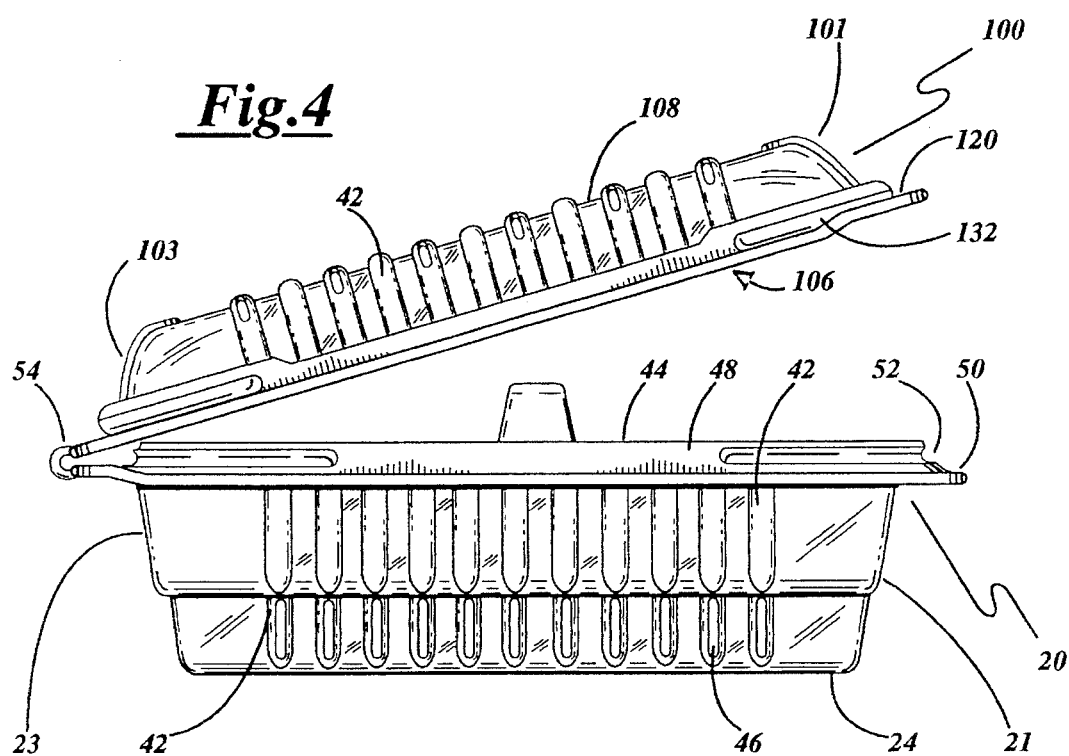
FIG. 4 is a side elevational view of the container of the type shown in FIG. 1 with the cover partially opened and rotated away from the tray.

The tray 20 has a front 21, parallel opposing sides 22, a back 23, and a bottom wall 24 (see FIGS. 3 and 4). The bottom wall 24 closes the bottom end of the tray 20. The front 21, parallel opposing sides 22 and back 23 may form a continuous side wall which surrounds the tray's interior storage area. Extending outwardly from the sides 22, front 21 and back 23 of the tray 20 are a plurality of ribs 42. The ribs 42 extend from the bottom 24 of the tray 20 to a top ledge 44. The ribs 42 provide rigidity and support to the tray 20. Slits 46 are formed within some of the ribs 42. The slits 46 provide a passageway for fluids to flow in and out of the tray 20 from the front, back and sides of the tray 20. Those skilled in the art will appreciate that feet may be added to the outer side of the bottom wall that engage with the top cover of a stacked container 10. The engaging feet would assist in preventing the stacked containers 10 from slipping off each other.

Referring to FIGS. 1 and 4, a top ledge 44 extends perpendicularly from the sides 22, front 21 and back 23 of the tray 20. Top ledge 44 forms an open end 28 of the tray 20. A perimeter shoulder 48 extends downward from the ledge 44, relatively parallel to the sides 22, front 21 and back 23 of the container 10. A lip 50 extends perpendicularly outward from the shoulder 48, forming a relatively planar surface surrounding the perimeter of the tray 20. Concave recesses 52 (see FIG. 4), formed on the tray perimeter shoulder 48, extend inward, around the perimeter of the tray 20, parallel with ledge 44.

The concave recesses 52 of the tray 20 mate and engage with ridges 132 of the cover 100. The engaged recesses 52 and ridges 132 provide a means for locking the cover 100 and tray 20 together to form the container 10. The container 10 being molded of a durable, pliable plastic, allows the ridges 132 of the cover 100 to be disengaged, thereby unlocking the cover 100 and tray 20.

Figure 2:
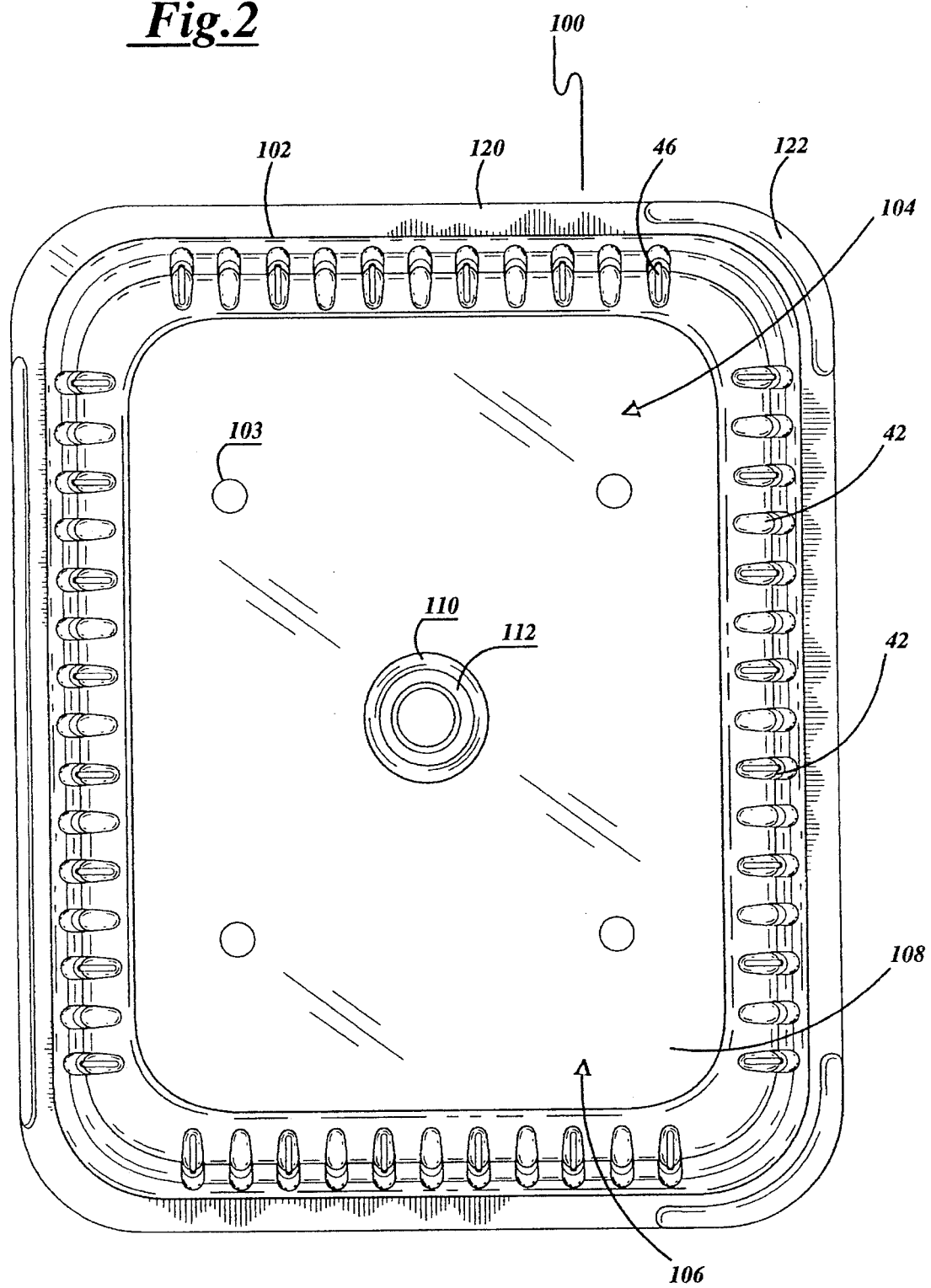
FIG. 2 is top view of the cover of the type shown in FIG. 1 rotated and closed onto the tray.

Referring again to FIGS. 1, 2 and 4 the cover 100 has spaced parallel sides 102, a front 101, and a back 103. The cover's sides 102, front 101 and back 103 may also form a continuous side wall. The front 101, back 103 and sides 102 (or continuous side wall) are separated a distance approximately equal to the tray's front 21, back 23 and sides 22 (or continuous sidewall). The cover 100 has a closed top 104 and bottom open end 106. The closed top 104 forms a support surface 108 for supporting other stacked containers.

Extending outwardly from the sides 102, front 101, and back 103 of the cover 100 are a plurality of ribs 42. The ribs extend from the top 104 of the cover 100, to a top ledge 116. The top ledge 116 extends around the perimeter of the sides 102, front 101, and back 103. The ribs 42 provide rigidity and support to the cover 100. Slits 46 are formed within some of the ribs 42. The slits 46 provide a further means of ventilation. The cover 100 may also have bores 103 extending through the top 104, providing further ventilation to the container 10.

A top ledge 116 extends perpendicularly from the sides 102, front 101, and back 103 of the cover 100. The top ledge 116 forms the open bottom 106 of the cover 100 (see FIG. 1). A perimeter shoulder 118 extends downward from the lip 116 and is relatively parallel to the sides, front and back of the cover 100. A lip 120 extends perpendicularly outward from the perimeter shoulder 118. The lip 120 forms a relatively planar surface surrounding the perimeter of the sides 102, front 101 and back 103 of the cover 100.

Ridges 132 are formed on the cover's perimeter shoulder 118 and extend outward, around the perimeter of the cover 100. The ridges 132 of the cover 100 mate and engage with recesses 52 of the tray. The ridges 132 and recesses 52 provide a means for locking the cover 100 and tray 20 together to form the container 10.

The perimeter of the cover's perimeter shoulder 118 is slightly larger than the perimeter of the tray's perimeter shoulder 48. Hence, when the cover 100 and tray 20 are engaged, the cover's ledge 116, shoulder 118, and lip 120 slides over and engages with the tray's ledge 50, shoulder 48, and lip 44.

At a plurality of points on the perimeter ledge 120 of the cover 100, the ledge 120 is raised. The raised portion 122 extends away from the covers open end 106 (see FIGS. 1 and 2). When the cover and tray are engaged, a gap is formed between the tray perimeter ledge 50 and the raised portion 122 of the cover perimeter ledge 120. This gap allows the cover 100 and tray 20 to be more easily disengaged. Both the cover 100 and tray 20 may have bores extending through the top and bottom allowing further ventilation and also providing a means of drainage.

A support means 26 formed in the tray 20, extends from the bottom 24 upwards towards the opening 28 of the tray 20. The support means may consist of a wedge, a pillar, a cone, or a plurality of the same which engage with the cover 100. In the preferred embodiment, the support means 26 tapers to a top support surface 30 forming a cone or conical support pillar. The top support surface 30 engages with the cover 100 preventing the cover 100 or tray 20 from sagging or bending in towards the container's center. The top support surface 30 and cone 26 also engage with the cover 100 in such a manner, wherein the tray and cover are aligned with respect to each other.

Extending from the top support surface 108 of the cover 100 towards the open end 106, is an conical locator 110. Formed within the conical locator is a conical or tapered recess 112. The conical recess 112 tapers towards the top support surface 108. The conical recess has its largest diameter at its opening. The smallest diameter of the tapered recess 112 is slightly larger than the diameter of the cone's 26 top support surface 30. When the cover 100 is aligned and closed onto the tray 20, the cone 26 positions itself inside the conical locator 110 thereby aligning the cover 100 and tray 20. The top support surface 30 of the cone 26 engages with the bottom of the tapered recess 112 of the conical locator 110 thereby providing support and preventing the top support surface 108 or bottom 24 from sagging or bending inward towards the container 10 inner center.

Figure 5:
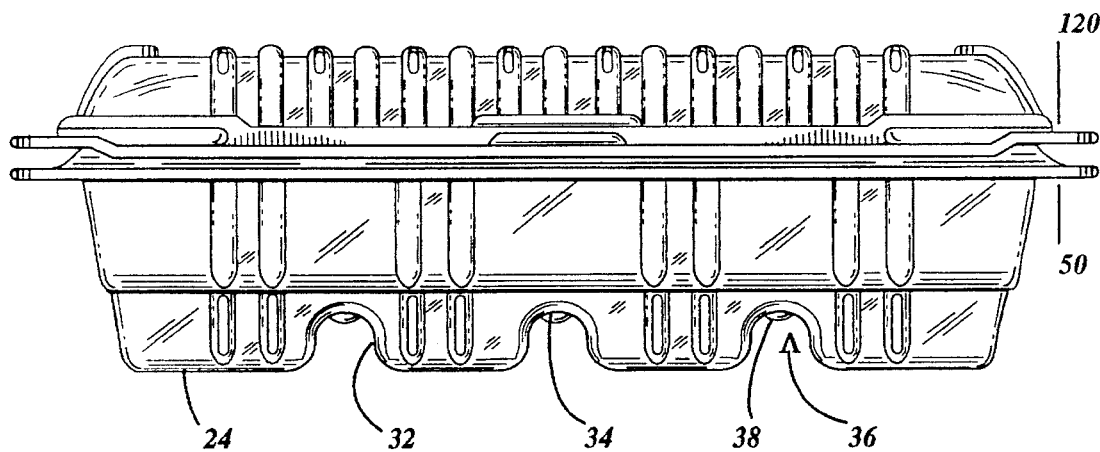
FIG. 5 is a front elevational view of the container of the type shown in FIG. 1 with the cover closed and rotated onto the tray.

Referring to FIGS. 3 and 5 elongated channels 32 are shown extending upward from an open end of the bottom wall 24 of the tray 20 to a peak 34. The elongated channel 32 has open ends and forms a passageway 36 beneath the tray's interior storage area. Openings 40 may be formed in each channel, thereby providing a ventilation means, which permits a transfer of fluid, including air, between the tray's interior storage area and the elongated channel's passageway. The fluid, including air, may also flow through the passageway 36 and circulate around the container 10. Those skilled in the art will appreciate that the ventilation means may be formed by other various geometric shapes. Without limitation, the preferred shape is an arcuate channel. In the preferred embodiment, at the peak 34 of each elongated channel 32 is a depression 38. The openings 40 are formed within the depression 38 smaller than the size of an average blueberry. The depression 38 is open to the interior storage area, and extends from the peak 34 into the passageway 36. Those skilled in the art will appreciate that the openings may be enlarged to allow greater ventilation to the interior of the container. A second channel may be formed in the elongated channel perpendicular to the depression 38, thereby allowing drainage of fluids from the interior of the tray into the opening 40.

When blueberries or other small perishables are placed within the container, the depression 38 width is narrow enough such that the blueberries do not contact the opening 40. The average diameter of a blueberry is greater than 0.300 inch. Therefore, a depression width of 0.300 inch or less would prevent the blueberries from contacting the opening 40. Hence, the blueberries don't block the passage of fluids into and out of the openings 40.

As air circulates around the container 10, the flow of air is directed by the passageway 36. The air flows into the passageway, and enters the container through the openings 40 formed in the depression 38. The position of each channel 32 determines the specific region of the container that will receive ventilation from the passageway 36. The openings 40 also permit drainage of moisture from the tray's interior storage area into the passageway 36.

Having described the constructional features of the blueberry container or box, the mode of use will now be discussed. With the bottom 24 of the tray 20 resting flat on a planar surface the operator may rotate the cover 100 open around the hinge 54. The operator then places blueberries inside the container to a desired level. The operator may then rotate the cover around the hinge until part of the covers perimeter ledge 120 engages with the trays perimeter ledge 50. The operator may then firmly press the cover onto the tray. The ridges 132 are pliable and snap into the recesses 52 of the tray 20, locking the cover and tray together.

After filling the containers 10, the operator may stack several containers 10 on top of each other for transportation or storage. The containers 10 may be stacked without damaging any of the blueberries contained within the container. The support means or cone helps support the stacked containers, and prevents the cover and tray from collapsing in toward the interior storage area. To prevent the blueberries from spoiling, cool air may be circulated around that stacked containers. The passageways 36 permit the air being circulated to pass through the passageway 36 and also through openings 40 formed in the depression 38. Hence the interior storage area is circulated with air. Any condensation formed within the container 10 may drain out through the openings 40 formed into the depression 38 of the channels 32.

The user may use fans to further aid in the ventilation of the containers 10 during shipping and storage. The containers may be stacked during shipping and storage, such that containers in the middle would not receive direct ventilation from the fans. The passageways 36 permits an airflow to both ventilate the interior storage area of a particular container, but also permits an airflow to pass under the interior storage area, thereby continuing the airflow. An airflow may pass through the passageways 36 of the containers 10 on the outer perimeter of a stack of containers, thereby providing an airflow to the center containers. The center container's passageways then directs the airflow into the interior storage area of the center containers. Hence, both the inner and outer containers of a stack of containers may be ventilated sufficiently.

This invention has been described herein in considerable detail in order to comply with the patent statutes and to provide those skilled in the art with the information needed to apply the novel principles and to construct and use such specialized components as are required. However, it is to be understood that the invention can be carried out by specifically different devices, and that various modifications, both as to the equipment details and operating procedures, can be accomplished without departing from the scope of the invention itself.

What is claimed is:

1. A tray having an interior storage area for containing perishable goods comprising;

(a) a continuous side wall surrounding the interior storage area, and forming an open top end and a bottom end;

(b) a bottom wall closing the bottom end of said continuous side wall; and (c) at least one elongated channel formed with said bottom wall and projecting to a peak toward the interior storage area, said elongated channel being open toward said bottom and having open ends, thereby forming a passageway beneath the interior storage area for permitting transfer of fluids through said passageway; said channel's peak includes a depression, open to the interior storage area and extending from said peak into said passageway, said depression having at least one opening between said passageway and the interior storage area for permitting the passage of fluids between the interior storage area and said channel.

2. The tray as recited in claim 1, wherein said depression has a width that is less 0.300 inches.

3. The tray as recited in claim 1, further comprising vertical ribs extending outward from said continuous side wall of the tray, providing support to the tray.

4. The tray as recited in claim 3, comprising ribs further having slits that provide a passage way for fluids to enter and exit.

5. A tray for securely enclosing perishable goods comprising:

(a) a tray including spaced parallel sides, front and back, an open top, and a closed bottom; and (b) at least one elongated channel formed with said closed bottom and projecting to a peak toward the interior storage area, said elongated channel being open toward said bottom and having open ends thereby forming a passageway beneath the interior storage area for permitting transfer of fluids through said passageway; said channel's peak includes a depression, open to the interior storage area and extending from said peak into said passageway, said depression having at least one opening between said passageway and the interior storage area for permitting the passage of fluids between the interior storage area and said channel.

6. The tray as recited in claim 5, wherein said depression has a width that is less 0.300 inches.

7. The tray as recited in claim 5, further comprising vertical ribs extending outward from said sides, front, and back of the tray, providing support to the tray.

8. The tray as recited in claim 5, comprising ribs further having slits that provide a passage way for fluids to enter and exit.

9. A container having an interior storage area for securely containing perishable goods comprising:

(a) a tray including a continuous side wall surrounding the interior storage area, and a closed bottom wall;

(b) a cover including a continuous side wall separated a distance approximately equal to said tray's continuous side wall, and a closed top; said cover being integrally associated with said tray, wherein said cover aligns and engages with said tray in mating relation; and (c) at least one elongated channel formed with said tray's closed bottom and projecting to a peak toward the interior storage area, said elongated channel being open toward the bottom, thereby forming a passageway beneath the interior storage area for permitting transfer of fluids through said passageway; said channel's peak includes a depression, open to the interior storage area and extending from said peak into said passageway, said depression having at least one opening between said passageway and the interior storage area thereby permitting the passage of fluids between the interior storage area and said channel.

10. The container as recited in claim 9, wherein said depression has a width that is less 0.300 inches.

11. The container as recited in claim 9, further comprising vertical ribs extending outward from said continuous side wall of said tray and said cover, said vertical ribs having slits that provide a passage for fluids to enter and exit.

12. The container as recited in claim 9, further comprising a support means positioned between said closed top of said cover and said closed bottom of said tray to prevent said cover and tray from bowing in towards the interior storage area of the container.

13. The container as recited in claim 9, further comprising a hinge attached to a side of said tray and a corresponding side of said cover, thereby joining said cover to said tray.

14. The container as recited in claim 9, further comprising a tray, cover, and hinge molded in one partially flexible plastic piece.

15. The container as recited in claim 9, wherein said cover and said tray comprise a locking means for fastening said cover to said tray.

* * * * *